United States Patent
York et al.

(10) Patent No.: US 10,488,156 B2
(45) Date of Patent: Nov. 26, 2019

(54) OPTICAL SYSTEM ACCESSORY WITH CANT INDICATION

(71) Applicant: Sig Sauer, Inc., Newington, NH (US)

(72) Inventors: Andrew W. York, Portland, OR (US); Gregory Scott Smith, Sherwood, OR (US); Richard Bradley Brumfield, Wilsonville, OR (US)

(73) Assignee: SIG SAUER, INC., Newington, NH (US)

( * ) Notice: Subject to any disclaimer, the term of this patent is extended or adjusted under 35 U.S.C. 154(b) by 342 days.

(21) Appl. No.: 15/372,877

(22) Filed: Dec. 8, 2016

(65) Prior Publication Data

US 2017/0082400 A1    Mar. 23, 2017

Related U.S. Application Data

(63) Continuation-in-part of application No. 15/220,254, filed on Jul. 26, 2016.

(60) Provisional application No. 62/264,690, filed on Dec. 8, 2015, provisional application No. 62/197,187, filed on Jul. 27, 2015.

(51) Int. Cl.
| | |
|---|---|
| *F41G 1/44* | (2006.01) |
| *G01C 9/06* | (2006.01) |
| *G02B 23/10* | (2006.01) |
| *G02B 27/34* | (2006.01) |

(52) U.S. Cl.
CPC ............... *F41G 1/44* (2013.01); *G01C 9/06* (2013.01); *G02B 23/10* (2013.01); *G02B 27/34* (2013.01); *G01C 2009/066* (2013.01)

(58) Field of Classification Search
CPC . F41G 11/003; F41G 1/17; F41G 1/18; F41G 11/001; F41G 11/004; F41G 11/007; F41G 1/04; F41G 1/08
USPC ........................................ 42/123; 33/366.11
See application file for complete search history.

(56) References Cited

U.S. PATENT DOCUMENTS

| | | | |
|---|---|---|---|
| 3,568,324 A | 3/1971 | Jorczak | |
| 5,005,308 A | 4/1991 | Parks | |
| 6,978,569 B2 | 12/2005 | Williamson, IV et al. | |
| 7,296,358 B1 | 11/2007 | Murphy et al. | |
| 7,654,029 B2 | 2/2010 | Peters et al. | |
| 7,752,798 B2 * | 7/2010 | Mayerle | F41G 1/41 42/118 |
| 9,127,911 B2 * | 9/2015 | Varshneya | F41G 3/08 |
| 9,157,701 B2 * | 10/2015 | Varshneya | F41G 3/165 |
| 9,285,187 B2 | 3/2016 | Stockdill | |

(Continued)

*Primary Examiner* — Yaritza Guadalupe-McCall
(74) *Attorney, Agent, or Firm* — Miller Nash Graham & Dunn LLP

(57) ABSTRACT

An electronic indicator accessory may be coupled to a standard scope, which is in turn coupled to a shooting device, to indicate whether the scope is canted. The indicator may be visual, haptic, or aural. If visual, the visual indicator may include one or more LEDs positioned on the periphery of the field of view, on an accessory body attached to the scope. The accessory body may be coupled near either the ocular or objective lens of the scope. The LEDs are coupled to a microprocessor which is, in turn, coupled to a solid-state electronic inclinometer that is incorporated into the internal structure of the optical system. The microprocessor is configured to selectively illuminate one or more of the visual indicators based on the output of the inclinometer, thereby indicating how the reticle is canted, if at all.

20 Claims, 15 Drawing Sheets

(56) References Cited

U.S. PATENT DOCUMENTS

| | | | |
|---|---|---|---|
| 9,347,742 B2* | 5/2016 | Varshneya | F41G 3/165 |
| 9,677,848 B2 | 6/2017 | Hamilton | |
| 9,677,851 B2* | 6/2017 | Hancosky | F41G 1/35 |
| 9,777,992 B2 | 10/2017 | McRee | |
| 9,874,421 B2 | 1/2018 | Stockdill | |
| 2004/0148841 A1* | 8/2004 | Burzel | F41G 1/44 |
| | | | 42/123 |
| 2007/0056203 A1 | 3/2007 | Gering et al. | |
| 2007/0137088 A1* | 6/2007 | Peters | F41G 1/473 |
| | | | 42/111 |
| 2007/0197314 A1 | 8/2007 | York et al. | |
| 2008/0104875 A1* | 5/2008 | Mayerle | F41G 1/40 |
| | | | 42/118 |
| 2014/0101982 A1* | 4/2014 | McPhee | F41G 1/44 |
| | | | 42/130 |
| 2014/0110482 A1* | 4/2014 | Bay | F41G 1/38 |
| | | | 235/404 |
| 2014/0184476 A1* | 7/2014 | McHale | G02B 27/017 |
| | | | 345/8 |
| 2014/0370993 A1* | 12/2014 | Roman | F41G 1/467 |
| | | | 463/51 |
| 2015/0106046 A1* | 4/2015 | Chen | G01B 11/00 |
| | | | 702/94 |
| 2015/0176948 A1* | 6/2015 | Varshneya | F41G 3/08 |
| | | | 235/404 |
| 2015/0198410 A1* | 7/2015 | McRee | F41C 27/00 |
| | | | 42/90 |
| 2016/0010949 A1* | 1/2016 | Teetzel | F41G 1/35 |
| | | | 42/115 |
| 2016/0223293 A1 | 8/2016 | Maryfield et al. | |
| 2016/0370147 A1* | 12/2016 | Hancosky | F41G 1/54 |
| 2017/0082400 A1* | 3/2017 | York | F41G 1/44 |
| 2017/0138698 A1* | 5/2017 | York | F41G 1/38 |
| 2017/0254619 A1* | 9/2017 | Scott | F41G 1/44 |

\* cited by examiner

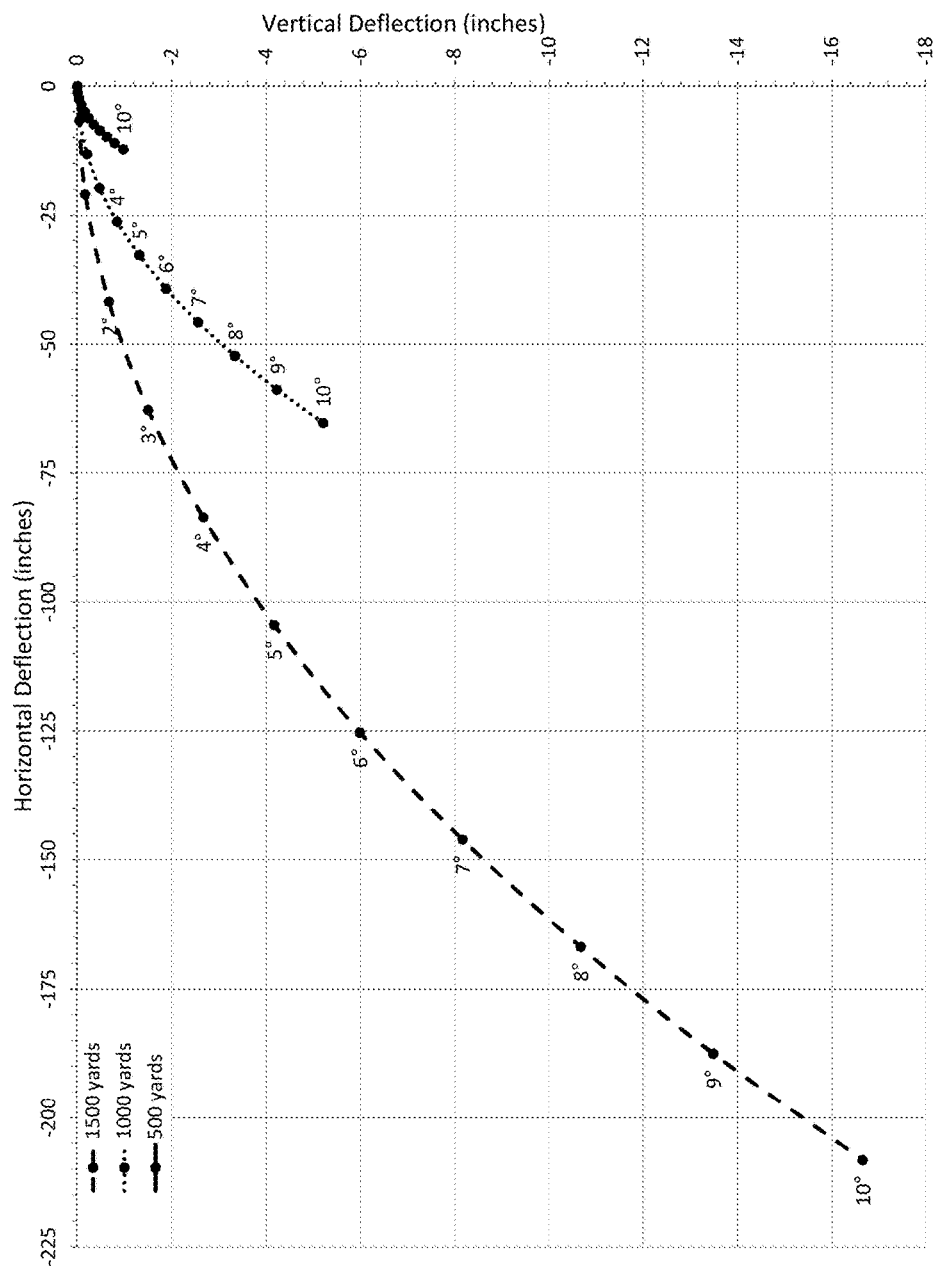

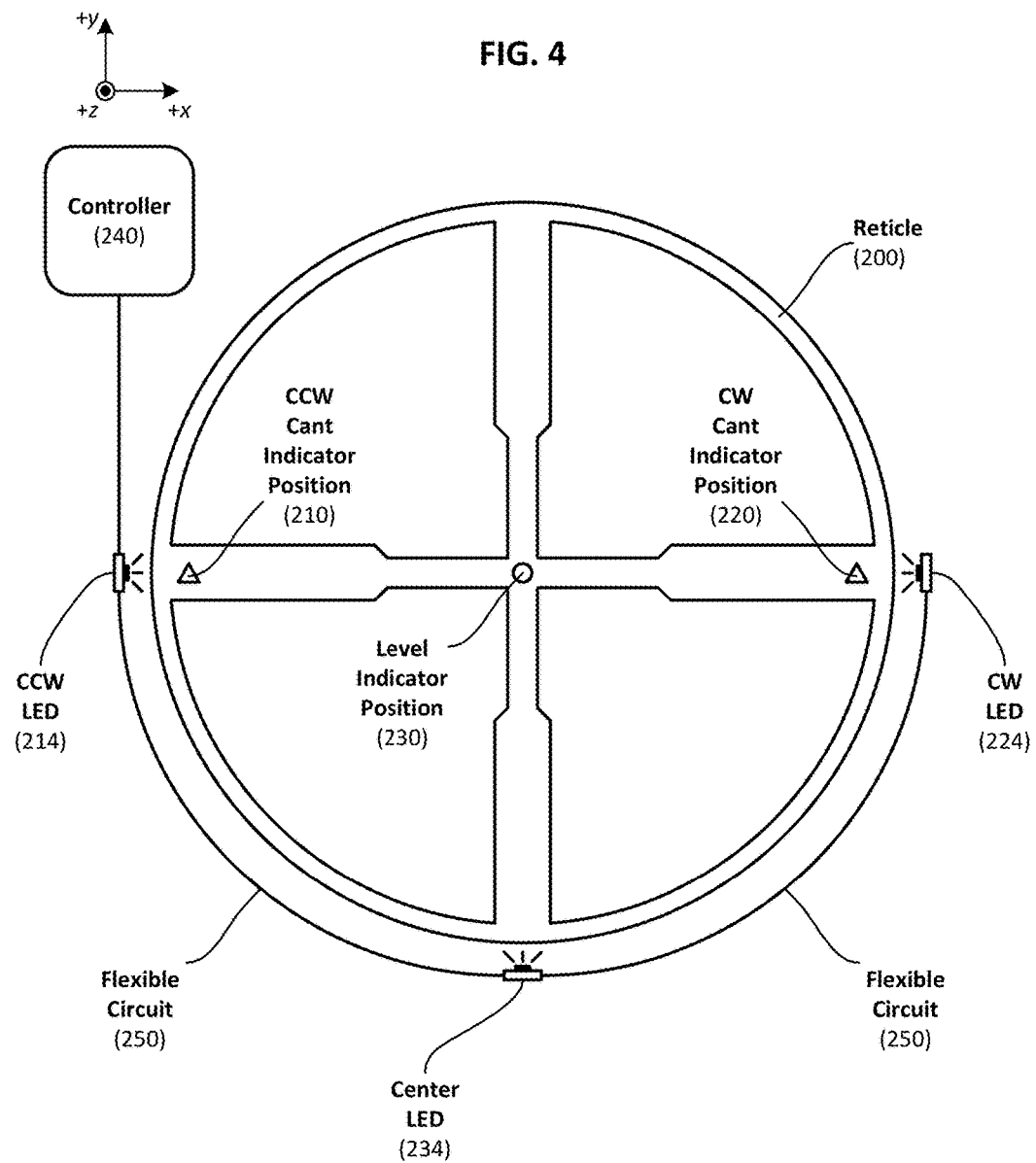

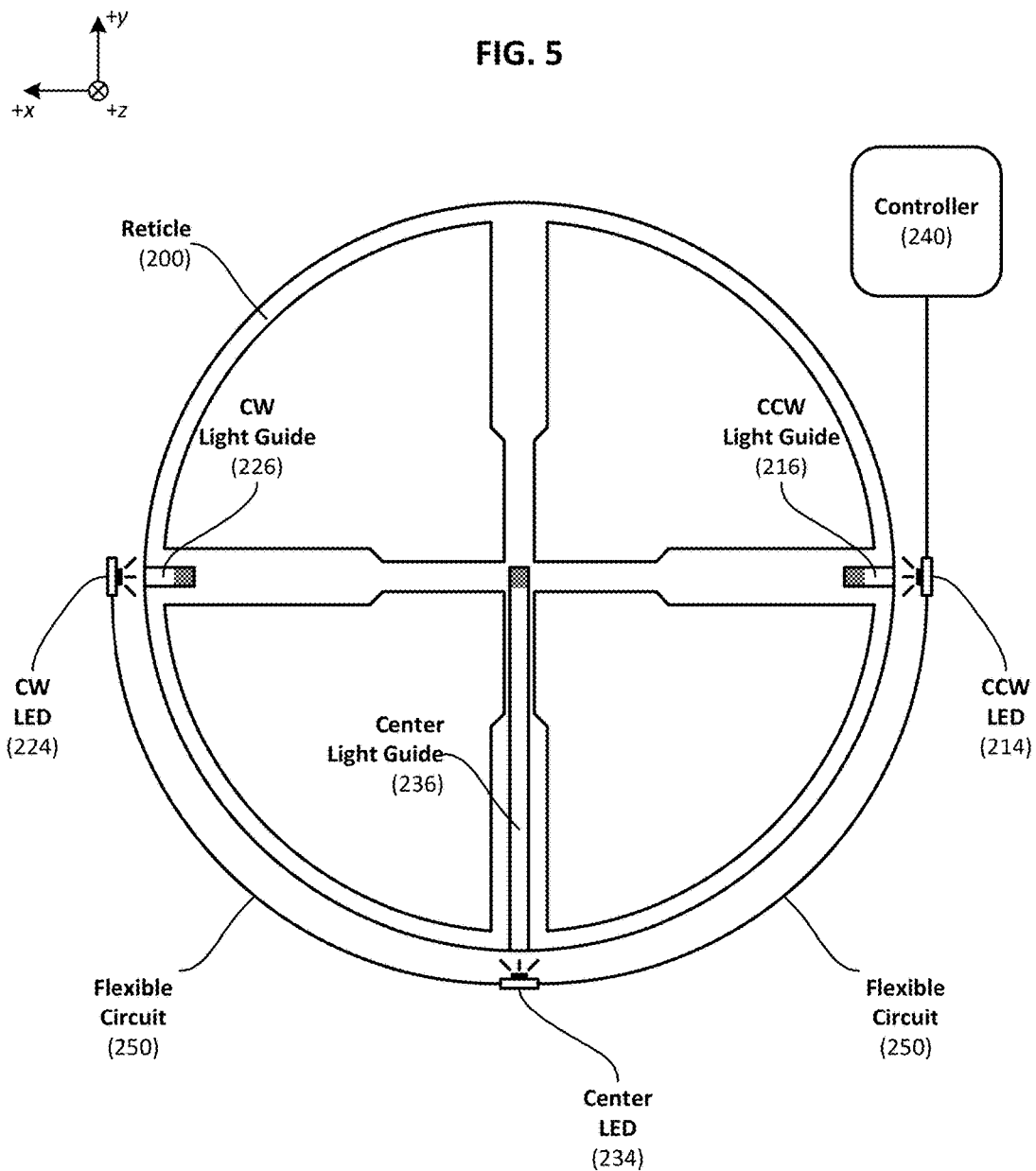

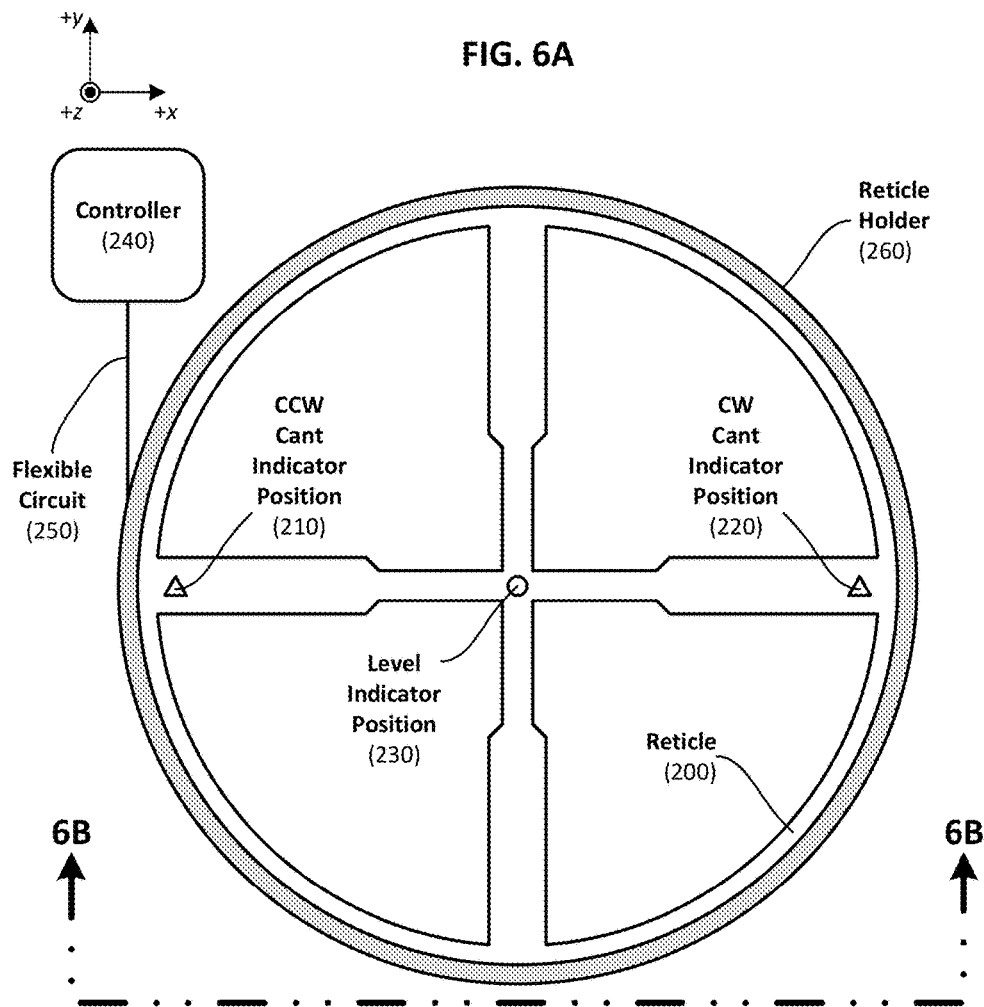
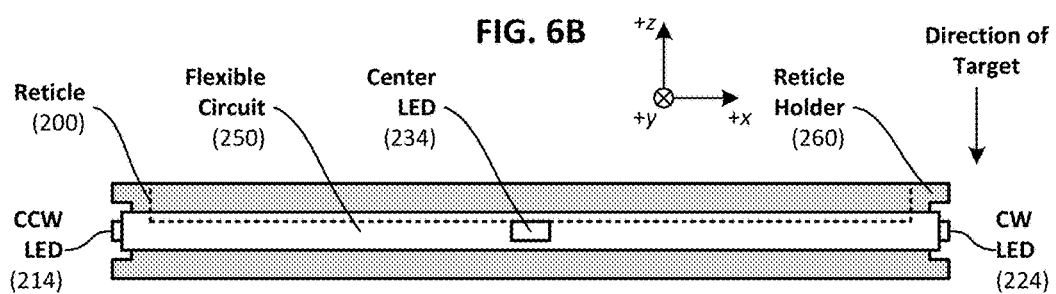

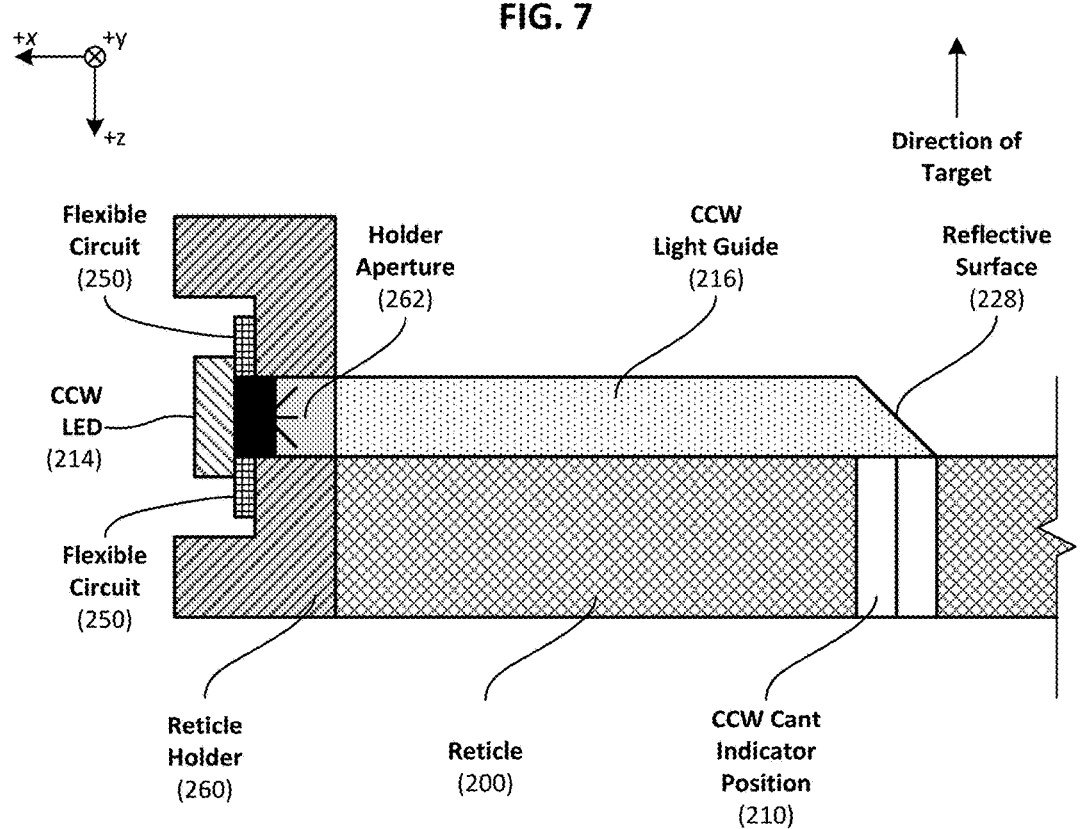

Reticle canted CCW.
CCW LED illuminated.
Center LED blinking.

Reticle canted CW.
CW LED illuminated.
Center LED blinking.

Reticle level.
Center LED steadily illuminated.

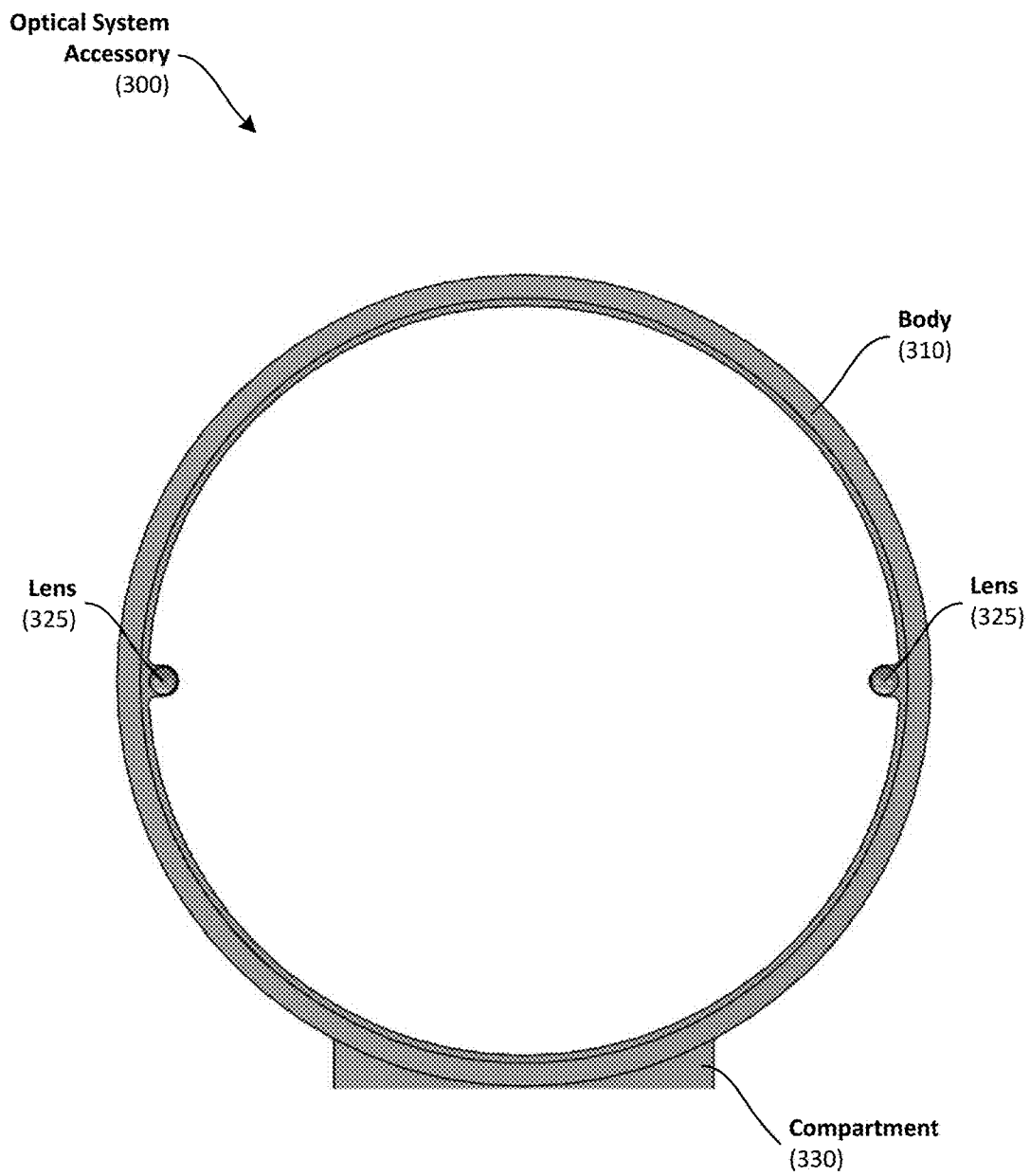

OPTICAL SYSTEM ACCESSORY WITH CANT INDICATION

CROSS REFERENCE TO RELATED APPLICATIONS

This application is a non-provisional of and claims benefit from U.S. Provisional Patent Application 62/264,690, filed Dec. 8, 2015 entitled OPTICAL SYSTEM ACCESSORY WITH CANT INDICATION, and is also a continuation-in-part of U.S. patent application Ser. No. 15/220,254, filed Jul. 26, 2016, entitled OPTICAL SYSTEM WITH CANT INDICATION, which, in turn, claims benefit from U.S. Provisional Patent Application 62/197,187, filed Jul. 27, 2015, entitled OPTICAL SYSTEM WITH CANT INDICATION, the contents of all of which are hereby incorporated by reference.

FIELD OF THE INVENTION

This disclosure relates generally to gun sighting systems, and more specifically, to an accessory for gun sighting systems that are capable of indicating whether the sighting system is canted off-center.

BACKGROUND

Accuracy and precision are of critical importance in a wide range of ballistics applications, examples of which include target shooting, hunting, self-defense, military, and law enforcement applications. Because the uncertainty associated with the unaided aiming of a firearm or other weapon is often significant, many improvements have been made to increase a shooter's ability to accurately hit an intended target. One such improvement is a telescopic sight, which is also sometimes referred to as a riflescope, or more simply, a scope, which are oftentimes mounted on long guns, but may also be used in conjunction with some handguns. A scope provides improved viewing of the target, for example using optical magnification, and therefore helps the shooter visualize where a projectile will go. In addition to providing magnification, a scope will also often include a reticle having stadia marks or other visual indicia that can be used to facilitate range-finding and to help the shooter adjust for the gravitational and aerodynamic (crosswind) forces that affect the trajectory of a projectile. For example, many reticles provide multiple aiming points for aiming at different distances or under different wind conditions.

Although a properly mounted and calibrated scope will help a shooter compensate for gravitational and aerodynamic forces, the way the firearm is held can still adversely affect the accuracy of the shot. In particular, side-to-side tilt of a scope mounted to a firearm, also referred to as "cant", is a potentially significant source of inaccuracy, and therefore even if a shooter makes appropriate adjustments for range and windage, his/her shot may still miss its intended target if the scope is canted even slightly off-center. FIGS. 1A and 1B illustrate cant. FIG. 1A illustrates a long gun having an optical system 10, such as a scope, mounted thereon. The optical system 10 has a long axis 12, which may also be referred to as the optical axis or the z axis. FIG. 1B illustrates the view directly along the z axis of the optical system 10, and illustrates two other axes. These axes include a horizontal transverse axis 14, and a vertical transverse axis 16. The transverse axes 14, 16 are both transverse to the z axis. Vertical deflection, or cant, of a system may be measured as deflection of the optical system from the vertical transverse axis 16. For example, an instantaneous axis 18 is not aligned with the vertical transverse axis 16. The mis-alignment between the instantaneous axis 18 and the vertical transverse axis 16 is caused by rotation about the z axis. This rotation amount, also referred to as cant or cant angle, is illustrated in FIG. 1B as the angle θ 20.

Canting a firearm to a small or even imperceptible degree can result in significant error downrange, particularly as the distance to the target increases. In a typically mounted scope, the optical axis of the scope is approximately one or two inches above the bore of the firearm. In this case, when the firearm and the scope are canted off-center, the bore of the firearm moves in the opposite direction as the scope. The resulting error manifests as both a horizontal and vertical deflection from the intended target. This error is illustrated in FIG. 2, which is a graph indicating projectile deflection at various ranges as a function of firearm cant angle. The data illustrated in FIG. 2 were modeled based on the trajectory of a 30 caliber, 180 grain Nosler ballistic tip hunting bullet fired from a .300 Winchester Magnum cartridge. At 1500 yards, only 1° of firearm cant results in 20.92 inches (1.74 feet) of horizontal deflection. Canting the firearm 10° results in 12.24 inches (at 500 yards), 65.28 inches (at 1000 yards), or 208.17 inches (at 1500 yards) of horizontal deflection. Vertical deflection is lesser in magnitude than horizontal deflection, but is still significant enough to make an otherwise accurate shot miss its target.

The data illustrated in FIG. 2 demonstrates the importance of reducing or eliminating cant when sighting a target through a scope. In particular, it should be appreciated that even if the shooter's intended target is properly sighted in the scope, a slight—and possibly imperceptible—cant may result in an errant shot. Many shooters rely on an inner sense of balance to ensure that their firearm is not canted. However, this reliance presupposes that the shooter has a fully functional, unimpaired sense of balance that reliably translates into the ability to hold a firearm without any cant. This often turns out not to be the case, particularly for shooters who are exposed to disorienting influences such as loud sounds and strong forces associated with shooting a firearm; repeated focusing on distant targets as viewed through one eye; prolonged periods of standing; exposure to the elements; and traversing or standing upon uneven, canted, and/or sloped terrain.

A number of systems have been developed to supplement a shooter's sense of balance and detect a canted firearm. For example, bubble- and/or fluid-based levels have been adapted for mounting on a firearm, scope, or mounting ring. These systems have limited precision due to fluid viscosity, are subject to freezing in extreme cold, are difficult to see in low light conditions, and often require the shooter to divert his/her attention from the target to determine whether the firearm is canted. For example, mechanical bubble levels are often installed on the exterior body of the riflescope or on an upper portion of a scope ring mount, thus requiring the shooter to move his/her eye away from the sight to see the bubble level. U.S. Pat. No. 6,978,569 discloses various embodiments of a firearm tilt indicator that relies on a physical mechanism, such as a gravity pendulum or a rolling ball. Mechanical systems such as these also often have limited precision, and they tend to fall out of calibration or otherwise fail after repeatedly being subjected to recoil forces. These shortcomings represent substantial obstacles to the development of a robust and reliable cant detection system that does not distract the shooter's attention from the target, and that can be used in a wide range of tactical environments. Other systems that display scope cant are also known, such as gun scope having a full Heads Up Display (HUD), as described in US Patent publication 2014/0184476. Such HUDs act as an opaque screen on which targeting information may be displayed. Other versions may overlay HUD information around the periphery of an optical viewing area. HUDs are generally fragile, expensive, and suffer negatively from exposure to rain, cold and other wet conditions that are often encountered in a typical hunting environment.

Embodiments of the invention address these and other limitations of the prior art.

SUMMARY

Embodiments of the invention include a cant-detecting device that is configured to be fixedly mounted to an optical system for a shooting device. The device includes an electronic inclinometer configured to determine a cant of the mounted optical system and an electronic indicator structured to provide an indicator signal to a user related to the determined cant. In some embodiments the device may be integrated into a hollow, ring-shaped body that is configured to be coupled to the optical system. It may be threadedly attached to the optical system at an ocular end of the optical system or to the objective end. The inclinometer and light emitter may be coupled to the body. The inclinometer may include one or more accelerometers. Some aspects of invention include a collimating lens in conjunction with the light emitting device.

Other embodiments of the invention include a cant-detecting accessory for an optical system having a hollow, at least partially ring-shaped body having interior and exterior circumferential surfaces, wherein the body is capable of engaging at least a portion of the optical system, a first light emitter coupled to the body, a compartment coupled to the body, and an inclinometer disposed within the compartment, where the inclinometer is configured to generate a signal in response to detecting that the optical system is canted, and where the first light emitter illuminates in response to the signal. In some embodiments, there are two light emitters in the accessory, and the first and second light emitters are coupled to the body and positioned diametrically opposite from one another. In some embodiments the inclinometer is configured to generate a second signal in response to detecting that the optical system is not canted, and the second light emitter is configured to illuminate in response to the second signal. In some embodiments the inclinometer is configured to generate a second signal in response to detecting that the optical system is not canted, and wherein the first and second light emitters are configured to illuminate in response to the second signal.

Yet other embodiments are directed to a cant-detection device including a hollow ring-shaped body having interior and exterior circumferential surfaces, and having an optical axis passing therethrough, a first collimator assembly positioned adjacent to one of the interior or exterior surfaces, a light emitter disposed in the first collimator assembly, a compartment coupled to the ring-shaped body that has an interior void, and an inclinometer disposed within the compartment. The inclinometer is configured to generate a signal in response to detecting rotation of the body around the optical axis, and the light emitter is configured to illuminate in response to the signal. The collimator assembly may be positioned adjacent to the interior surface or the exterior surface of the hollow-ring shaped body. Some aspects also include a protective lens cover mounted to the compartment, where the protective lens cover is structured to remain in either an open position or a closed position unless acted upon. The lens cover may be rotatable with respect to the body. The void of the compartment contains the inclinometer, the battery, and a circuit. When a switch coupled to the circuit is closed, the battery supplies power to the light emitter, and when it is opened, the switch prevents the battery from supplying power to the light emitter. In some aspects, opening or closing the protective lens cover also causes the switch to be opened or closed. The lens cover may be hingedly mounted to the compartment containing an electrical circuit.

BRIEF DESCRIPTION OF THE DRAWINGS

FIG. 2 is a graph indicating projectile deflection at various ranges as a function of firearm cant angle.

FIG. 4 schematically illustrates the frontward appearance of an example reticle that is capable of indicating whether an optical system is canted off-center.

FIG. 5 schematically illustrates the rearward appearance of an example reticle that is capable of indicating whether an optical system is canted off-center.

FIG. 6A schematically illustrates the frontward appearance of an example reticle that is capable of indicating whether an optical system is canted off-center, wherein the reticle is mounted in a ring-shaped reticle holder.

FIG. 6B schematically illustrates the reticle and reticle holder assembly of FIG. 6A, as viewed along line 6B-6B.

FIG. 7 schematically illustrates a cross-sectional view of an example technique for coupling light from a peripherally-positioned light emitter to an aperture formed in a reticle.

FIG. 13 schematically illustrates the frontward appearance of an example optical system accessory that is capable of indicating whether an optical system is canted off-center.

DETAILED DESCRIPTION

The various embodiments of an optical system having cant detection and indication disclosed herein are, compared to previous devices, less susceptible to error caused by exposure to adverse environmental conditions and/or recoil forces. They also tend to reduce or eliminate the need for the shooter to divert his/her attention from a sighted target to check a cant indicator, and the illuminated indicators work well in low light conditions. They are more rugged and less fragile than HUD systems. They can also be retrofitted to existing scopes. These and other advantages will be apparent from the following disclosure.

The various embodiments disclosed herein are described in conjunction with a projectile aiming system that is configured for use with a rifle and that is embodied in the type of telescopic sight typically referred to as a riflescope. However, such embodiments may also be implemented with projectile aiming systems other than riflescopes, including systems such as reflex sights, bow sights, pistol sights and digital sights. Such systems may be used on weapons other than rifles, including devices which are capable of propelling projectiles along substantially pre-determinable initial trajectories. Examples of such devices include handguns, pistols, shotguns, bows, crossbows, artillery, trebuchets, and the like.

Furthermore, while several of the embodiments disclosed herein are described in conjunction with a shooter attempting to hit an intended target, it will be appreciated that such embodiments can also be used to accurately mount a riflescope to a firearm. For example, in one implementation a firearm is fixed in a level position, for example using a vice or other temporary fixed holder. The firearm includes mounting rings that are used to support a riflescope. The riflescope is placed in the mounting rings. The user sights through the riflescope and ensures that the scope is not canted before tightening the mounting rings and fixing the relatively alignment of riflescope and firearm. Such a technique is significantly more likely to result in a substantially aligned system as compared to a manual alignment, particularly since an imperceptible degree cant may result in significant error downrange.

Figure 1A:
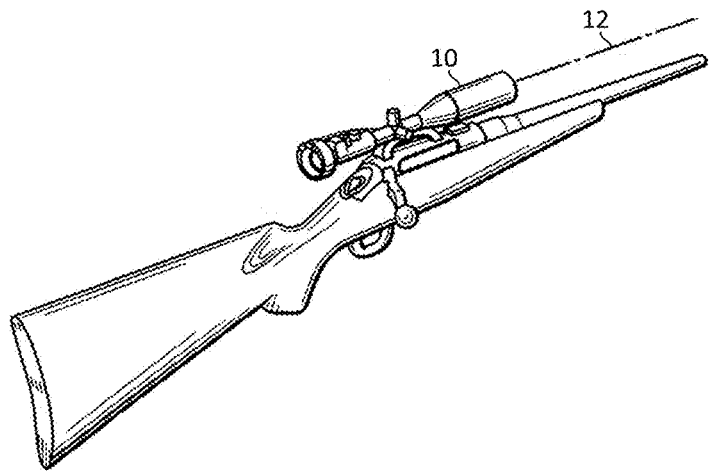
FIG. 1A is a perspective view of an example riflescope illustrating a long axis.
Figure 1B:
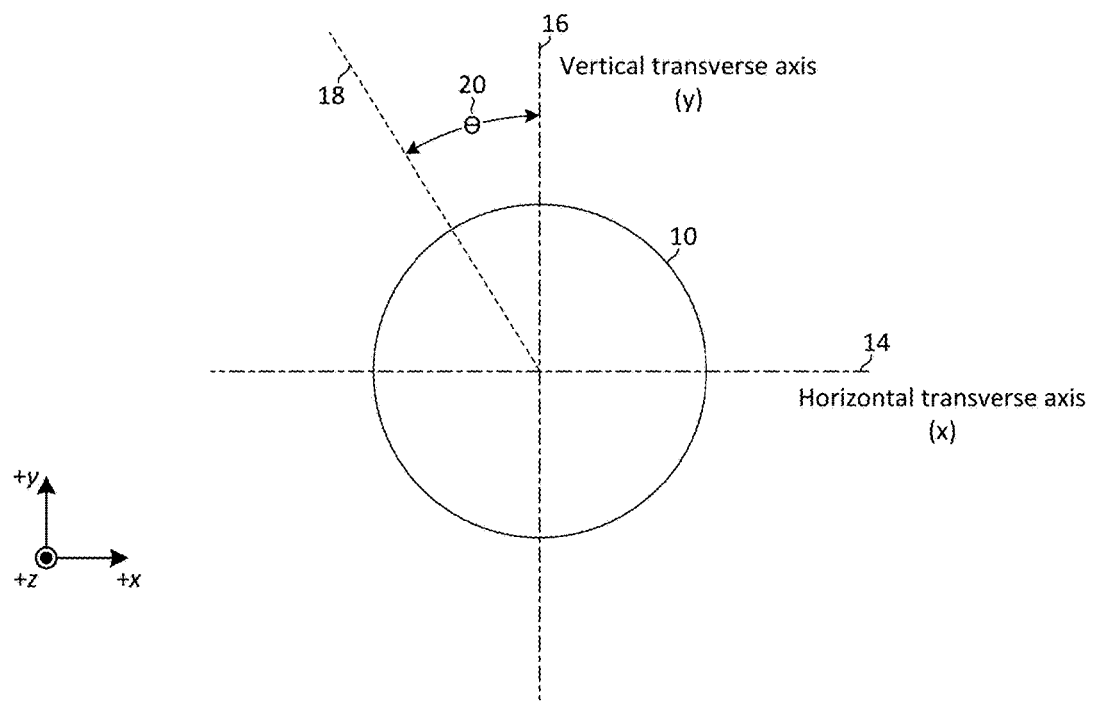
FIG. 1B is a graph illustrating orientation of various axes relative to the long axis illustrated in FIG. 1A.
Figure 3:
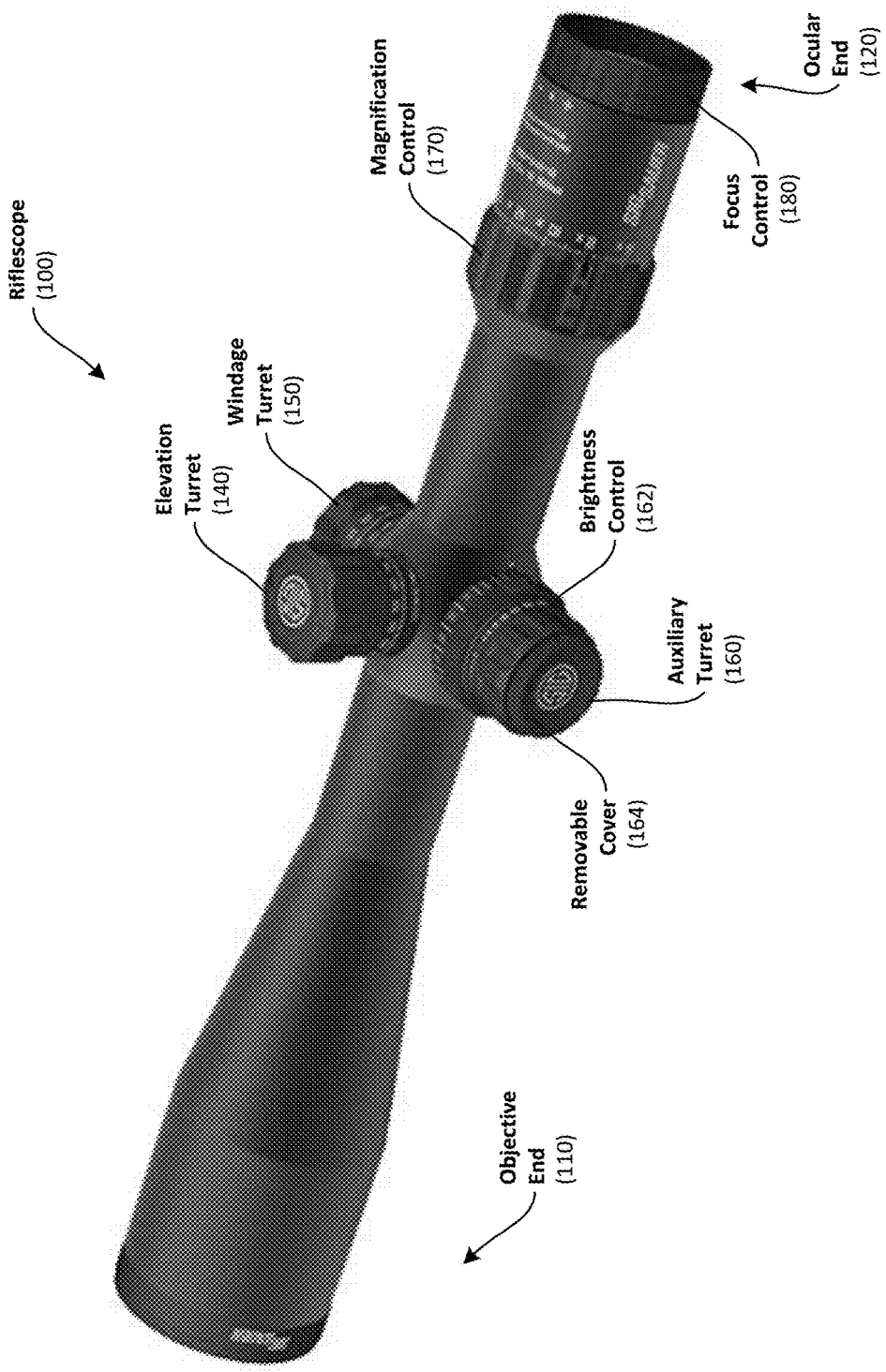
FIG. 3 is a perspective view of an example riflescope that may be used with a reticle that is capable of indicating whether the riflescope is canted off-center.

FIG. 3 is a perspective view of a riflescope 100 that may be used with an indicator system that is capable of indicating whether riflescope 100 is canted off-center. The indicator is positioned within riflescope 100, along its optical axis, and therefore is generally not visible in the exterior perspective view illustrated in FIG. 3, but in other embodiments the indicator may be visible to the exterior of the riflescope. An objective end 110 of riflescope 100 is positioned toward the intended target, while an ocular end 120 is positioned adjacent to the shooter's eye. Riflescope 100 includes an elevation turret 140 which can be used to adjust the vertical calibration of the reticle, and a windage turret 150 which can be used to adjust the horizontal calibration of the reticle. An auxiliary turret 160 can be used to provide other adjustments or manipulations to riflescope 100, such as a parallax compensation adjustment or, for implementations that include an illuminated reticle, an illumination brightness control 162. The reticle is preferably aligned with the riflescope turrets, for example to within ±3° or ±1°. While auxiliary turret 160 is positioned on the side of the riflescope body in the illustrated embodiment, in other embodiments it may be placed on the top of the riflescope body adjacent to ocular end 120.

In the illustrated embodiment, riflescope 100 includes electronics that rely on a power source, and therefore includes a battery that is accessible via a removable cover 164 that forms part of auxiliary turret 160. In one embodiment removable cover 164 is threaded onto the body of auxiliary turret 160, while in other embodiments a snap-fit configuration is used. In still other embodiments auxiliary turret 160 is omitted altogether and its associated functionality, such as reticle illumination control, is optionally incorporated into one or more of the other turrets. Riflescope 100 also optionally includes a magnification control 170 and/or a focus control 180. While many implementations are described in the context of riflescope 100, other embodiments can be implemented in conjunction with a wide range of different telescopic sighting systems, and thus it will be appreciated that the particular combination and arrangement of features illustrated in FIG. 3 may be modified in other embodiments.

In some embodiments the cant indicator may be integrated into or on a reticle. A reticle is an object or image that is viewable through the eyepiece of an optical sighting device. Example reticles include strands of hair, spider web silk, synthetic fibers, wires, electroformed metallic elements, or any other sufficiently thin and strong material. A reticle helps the shooter aim the fire arm toward a target. While a virtually unlimited range of different reticle shapes and configurations exist, perhaps the simplest reticle design is a crosshair formed by perpendicularly intersecting lines in the same of a plus symbol (+). Other common reticle configurations include dots, posts, circles, scales, or any combination of the foregoing, with the particular configuration being selected based on the intended use of the device that incorporates the reticle. When used in conjunction with projectile aiming systems, reticles often include stadia marks that facilitate range-finding. For example, a reticle that includes stadia marks can be used to estimate the range to objects of known size and the size of objects at known range, thus helping a shooter more accurately compensate for factors such as gravitational effects (also referred to as "bullet drop compensation") and windage. In some applications reticles are configured with stadia markings that includes ballistic hold-over points that are matched for long-range precision shooting.

FIG. 4 schematically illustrates the frontward appearance of an example reticle 200 that is capable of indicating whether an optical system is canted off-center. As used herein, the term "frontward appearance" refers, in addition to its ordinary meaning, to the appearance of reticle 200 when viewed under normal usage conditions, that is, from ocular end 120 of riflescope 100. From this perspective, the intended target would appear behind reticle 200, that is, in the −z direction as illustrated in FIG. 4. Reticle 200 includes horizontal and vertical stadia lines that meet at a target point. Depending on the demands of a particular implementation, the stadia lines may or may not be of constant width, and may or may not extend across the entire field of view. The example embodiment illustrated in FIG. 4, for instance, includes stadia lines which are wider near the reticle periphery, and which are narrower near the target point. In such embodiments, reticle 200 is formed using a flattened wire or an electroformed metallic element, although other materials can be used in other embodiments.

The horizontal stadia line of reticle 200 includes a CCW cant indicator position 210 and a CW cant indicator position 220 which are located on opposite sides of the center target point. A level indicator position 230 is optionally located at the target point. In the illustrated embodiment, the cant indicators are in the shape of an upward pointing triangle and the level indicator is in the shape of a circle. However, different shapes can be used for these indicators in other embodiments. The indicators provide a path for light to pass through reticle 200 at the respective indicator positions, thus giving the indicator an illuminated appearance, as will be described in turn. In particular, light generated by a CCW LED 214 is visible at CCW cant indicator position 210, light generated by a CW LED 224 is visible at CW cant indicator position 220, and light generated by a center LED 234 is visible at level indicator position 230. These LEDs are positioned around the periphery of reticle 200, and are connected to a controller 240 via a flexible circuit 250.

A wide range of alternative configurations may be implemented. For example, while FIG. 4 illustrates the CCW and CW cant indicator positions as being located on opposite sides of the target point, in other embodiments the cant indicator positions may be positioned elsewhere in the field of view, including both on one side of the target point. In some cases, one or more of the cant indicator positions may be located above or below the horizontal stadia line. While LEDs are used as light sources in the illustrated embodiment, other light sources can be used in other embodiments. While position 230 is referred to as a level indicator position, it will be appreciated that in embodiments wherein such position is continuously illuminated regardless of whether or not the system is canted, such position may also be referred to as a target indicator, an aiming point indicator, or another similar term.

FIG. 5 schematically illustrates the rearward appearance of reticle 200. As used herein, the term "rearward appearance" refers, in addition to its ordinary meaning, to the appearance of reticle 200 when viewed from the opposite (+z) direction as in FIG. 3, and therefore the rearward appearance would not be visible under normal use of riflescope 100. As can be seen from this perspective, reticle 200 includes a CCW light guide 216 positioned to propagate light emitted from CCW LED 214 through CCW cant indicator position 210 such that the light is visible from ocular end 120 of riflescope 100. Reticle 200 also includes a CW light guide 226 positioned to propagate light emitted from CW LED 224 through CW cant indicator position 220 such that the light is visible from ocular end 120 of riflescope 100. Likewise, reticle 200 includes a center light guide 236 positioned to propagate light emitted from center LED 234 such that the light is visible from ocular end 120 of riflescope 100. Center light guide 236 is longer than the other light guides because it extends to the target point at the center of reticle 200.

The light guides illustrated in FIG. 5 may include any suitable material capable of propagating visible light, examples of which include fiber optic cables, as well as plastic, polymeric, or glass waveguides. For example, in one embodiment an optical fiber has one end cut at a 45° angle to the optical axis of the fiber, thus forming a reflective surface that causes the light emitted by the peripheral LEDs to be redirected along the optical axis toward ocular end 120 of riflescope 100 (+z direction). This allows the user to look directly at the light emitter through the optical fiber. In such embodiments the light emitted by the peripheral LEDs is not reflected off electroformed reticle material. In such embodiments the optical fiber can be mounted to the front or rear of reticle 200. Mounting the optical fiber to the front of reticle 200 tends to be easier to manufacture, but may introduce parallax since the fiber is on a different focal plane than the actual electroformed reticle. Alternatively, mounting the optical fiber to the rear of reticle 200 and aligning the reflective surface with a small aperture in the electroformed reticle allows the reticle and the light source to be substantially coplanar, thus reducing eliminating parallax.

In an alternative embodiment a light-propagating channel is etched into reticle 200. In another alternative embodiment the light guides are omitted altogether, and light emitted from the peripheral LEDs illuminates reflective electroformed reticle materials deposited at the indicator positions illustrated in FIG. 4. Additional details with respect to how light is coupled and propagated amongst the various components illustrated in FIG. 5 will be described in turn. Because the light guides are formed on and/or positioned behind the reticle stadia wires, they are generally not visible to a user not looking through riflescope 100. FIG. 5 also illustrates that the aforementioned LEDs are positioned around the periphery of reticle 200, and are connected to controller 240 via flexible circuit 250.

FIG. 6A schematically illustrates the frontward appearance of reticle 200 having been mounted in a ring-shaped reticle holder 260. Reticle holder 260 is used to secure and mount reticle 200 within the body of riflescope 100, and thus these components are configured to fit securely together for example using a snap fit and/or an epoxy. Reticle holder 260 is also used to secure flexible circuit 250 and the LEDs mounted thereto. This is made clear with reference to FIG. 6B, which schematically illustrates the assembly of FIG. 6A, as viewed along line 6B-6B, that is, in the xz plane. In particular, FIG. 6B illustrates reticle 200 positioned within reticle holder 260. Flexible circuit 250 is positioned around an exterior circumferential surface of reticle holder 260. The light sources CCW LED 214, CW LED 224, and center LED 234 are mounted to flexible circuit 250 at appropriate locations around the circumference of reticle holder 260. In particular, FIG. 6B illustrates that center LED 234 is positioned at the bottom-center of reticle holder 260, while CCW LED 214 and CW LED 224 are positioned at the left and right sides, respectively, of reticle holder 260.

FIG. 7 schematically illustrates a cross-sectional view of an example technique for coupling light from a peripherally-positioned light emitter to an aperture formed in reticle 200. More specifically, FIG. 7 illustrates reticle 200 mounted in reticle holder 260. Reticle 200 includes CCW cant indicator position 210, which can be seen as forming an aperture in reticle 200, thereby allowing the reticle and the light source to be positioned in the same focal plane, thus reducing or eliminating parallax. Flexible circuit 250 is positioned on an exterior circumferential surface of reticle holder 260, and supports CCW LED 214, which is mounted thereto. Reticle holder 260 further includes a holder aperture 262 configured to allow light emitted by CCW LED 214 to pass through reticle holder 260 and enter CCW light guide 216. In certain embodiments holder aperture 262 is filled with a light transmitting material, for example the same material that comprises CCW light guide 216, while in other embodiments, such as that illustrated in FIG. 7, holder aperture 262 is empty space. CCW light guide 216 includes a reflective surface 228 that is angled so as to reflect light that is emitted from CCW LED 214, and that is transmitted via CCW light guide 216, through CCW cant indicator position 210. Such light is then visible to a user looking through riflescope 100 in the direction of the intended target (the −z direction). In one embodiment, reflective surface 228 includes reflective electroformed reticle material. While FIG. 7 illustrates the transmission of light from CCW LED 214 through CCW cant indicator position 210, it will be appreciated that a similar configuration can be used to transmit light (a) from CW LED 224 through CW cant indicator position 220, and (b) from center LED 234 through level indicator position 230.

The example embodiment illustrated in FIGS. 6A, 6B, and 7 illustrate CCW cant indicator position 210 and CW cant indicator position 220 being positioned on a horizontal stadia line of reticle 200, horizontally offset from reticle holder 260. In alternative embodiments, however, cant indicator positions 210, 220 are not positioned on the reticle itself, but rather on another element that forms part of the optical system. For example, in one alternative embodiment wherein a glass reticle is mounted in a black or other dark-colored field stop that functions as reticle holder 260, CCW cant indicator position 210 and CW cant indicator position 220 may be formed in the field stop itself, as opposed to being positioned on a stadia line of reticle 200. This alternative embodiment reduces the degree to which reticle 200 is manipulated by coupling thereto components such as light guides 216, 226, or forming cant indicator positions 210, 220 therein. Such an embodiment may be particularly useful in conjunction with a front focal plane (FFP) optical system wherein the aiming reticle is positioned on the first focal plane. This is because a FFP optical system allows the reticle image to magnify as the objective image is magnified. As the reticle image is magnified, the perimeter features of the reticle, such as indicator positions 210, 220 are no longer visible. In FFP optical systems, it may therefore be preferred to locate indicator positions 210, 220 in reticle holder 260, field stop, eyepiece, or in another location that would remain visible and stationary, appearing as a circumferential border or frame to the magnified reticle 200, regardless of the applied magnification. In any embodiment, the indicator may be positioned anywhere that the user may view the indicator while looking through the scope, be it at or near the front focal plane, at or near the rear focal plane, in or near an eyepiece, or anywhere where the indicator may be used by the shooter.

Figure 8:
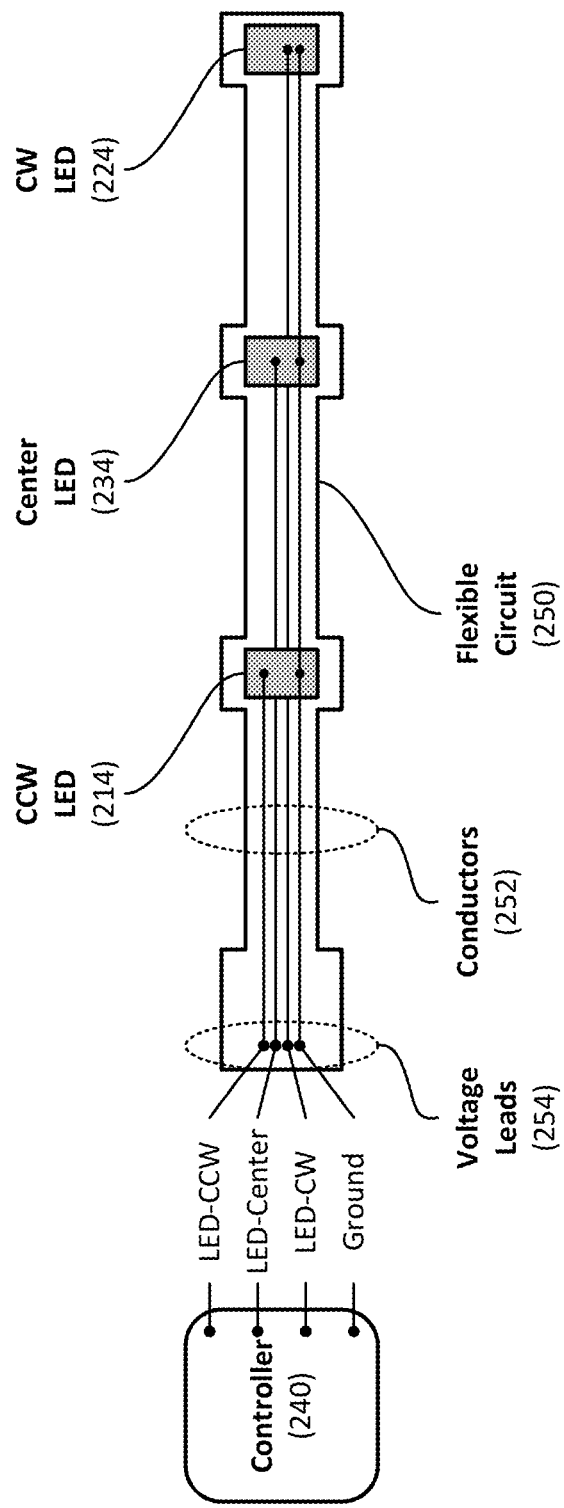
FIG. 8 schematically illustrates the configuration of an example flexible circuit that can be used in conjunction with the reticle illustrated in FIG. 4.

FIG. 8 schematically illustrates an example configuration of flexible circuit 250. As described herein, in certain embodiments flexible circuit 250 is positioned along an exterior circumferential surface of reticle holder 260. In alternative embodiments, flexible circuit 250 can be integrated into, or otherwise positioned in an interior portion of reticle holder 260. In still other embodiments, flexible circuit 250 is coupled directly to reticle 200. Light emitters CCW LED 214, CW LED 224, and center LED 234 are mounted to flexible circuit 250, for example using soldered connections. A plurality of conductors 252 extend from controller 240 to the light emitters. Conductors 252 include a ground conductor and an individual voltage lead dedicated to each emitter, thereby allowing each emitter to be controlled independently of the others. Conductors 252 are coupled to controller 240 via a plurality of voltage leads 254.

Figure 9:
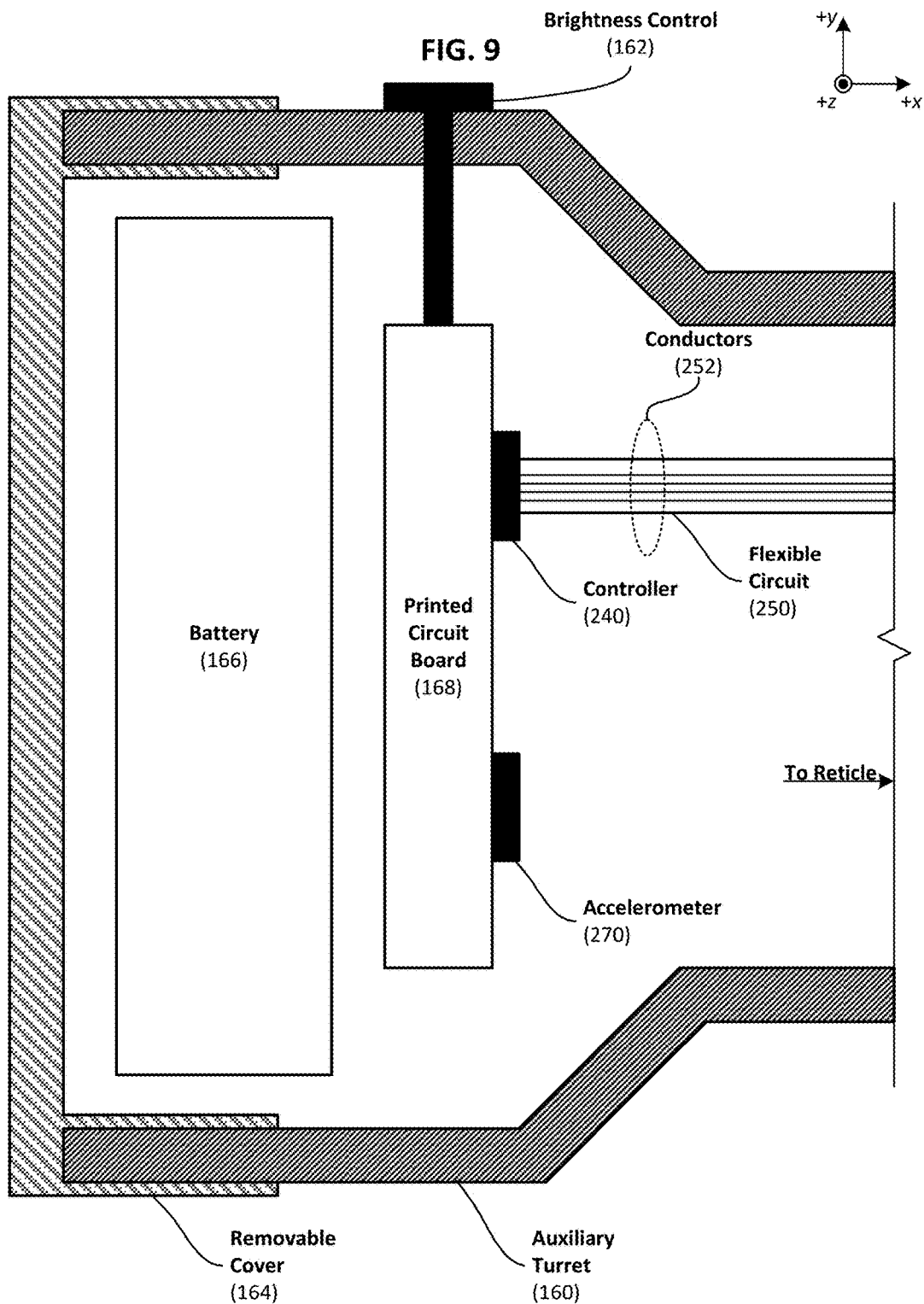
FIG. 9 schematically illustrates selected components included within an auxiliary turret of the riflescope illustrated in FIG. 3, the selected components supporting the operation of a reticle that is capable of indicating whether the riflescope is canted off-center.

FIG. 9 schematically illustrates selected components included within auxiliary turret 160 of riflescope 100, the selected components supporting or otherwise controlling the operation of reticle 200. For example, auxiliary turret 160 houses a battery 166 that is accessible via removable cover 164, and that functions as a power source for the aforementioned light sources. In one embodiment battery 166 comprises a three-volt coil cell lithium battery, although any of a wide variety of suitable power sources can be used in other embodiments. In the illustrated embodiment auxiliary turret 160 also houses a printed circuit board 168 on which electronics that enable and control operation of reticle 200 are mounted. Such electronics include controller 240 and an inclinometer 270. Mounting these components on printed circuit board 168 enables both to share the common power supply provided by battery 166.

Controller 240 is electronically connected to the aforementioned light emitting elements (for example, CCW LED 214, CW LED 224, and center LED 234) via conductors 252 which are mounted on flexible circuit 250. Firmware in controller 240 is capable of individually illuminating the various light emitters in response to signals received from inclinometer 270. In one implementation controller 240 is a Model STM8L151C2U6 ultra-low-power microcontroller manufactured by STMicroelectronics (Geneva, Switzerland). Brightness control 162 is coupled to controller 240 via printed circuit board 168, thereby further allowing the user to manipulate the operation of reticle 200. In one embodiment brightness control 162 comprises a rotatable switch that is coupled to a potentiometer on printed circuit board 168. Other configurations can be implemented in other embodiments. It will be appreciated that certain of the components illustrated in FIG. 9 may be electronically connected to each other with appropriate connectors and/or conductors which are not illustrated for clarity.

Figure 10:
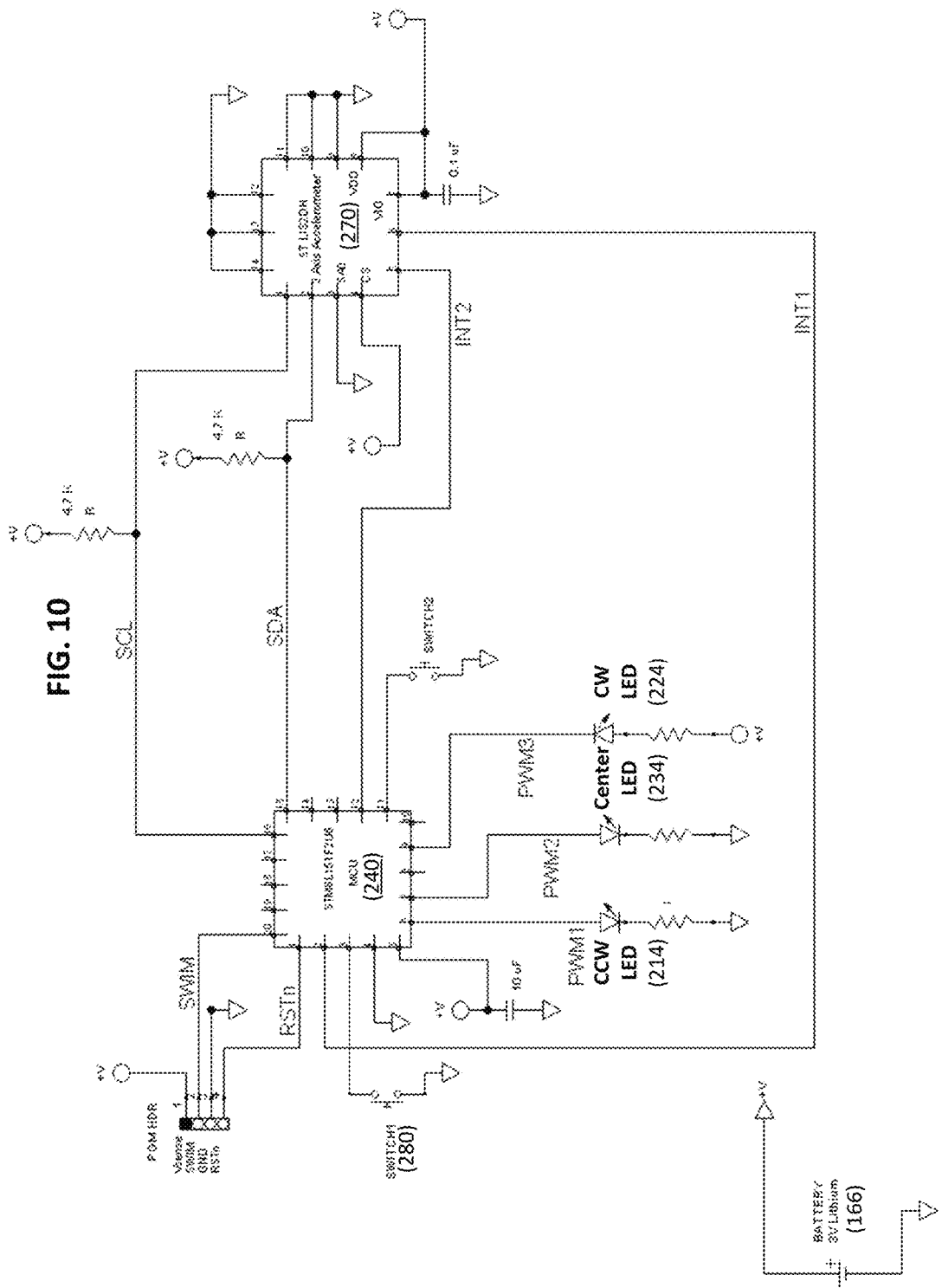
FIG. 10 is a circuit diagram illustrating selected electronic components that can be used to control the operation of an example reticle that is capable of indicating whether an optical system is canted off-center.

FIG. 10 is a circuit diagram illustrating one particular implementation of selected electronic components that can be used to control the cant indicator. Certain of these components (such as controller 240 and inclinometer 270) may be mounted on printed circuit board 168 itself, while other components (such as battery 166, CCW LED 214, CW LED 224, and center LED 234) may be electronically coupled to printed circuit board 168 or other components mounted thereto. For instance, the example embodiment illustrated in FIG. 10 includes a switch 280 that can be used to disable the device when not in use, thereby preserving battery life. In such embodiments switch 280 is optionally coupled to a mechanical switch positioned on the exterior of riflescope 100, for example on auxiliary turret 160.

Inclinometer 270, which may be embodied by an accelerometer, is a solid-state electronic device configured to determine whether riflescope is canted off-center. The accelerometer may be a 1-axis, 2-axis, or 3-axis accelerometer, for example. In other embodiments the inclinometer 270 may be any device capable of detecting and/or measuring cant. In the example embodiment illustrated in FIG. 9, inclinometer 270 is vertically oriented (in the yz plane), although it may be calibrated for use in other orientations as well. Thus, in certain embodiments inclinometer 270 is calibrated and aligned with reticle 200 during manufacture of riflescope 100 to detect rotation around the z-axis, which is the optical axis of riflescope 100. In other embodiments the cant indicator is separate from the reticle 200, but still aligned with the optical axis of the riflescope 100. Calibration may additionally or alternatively be performed when riflescope 100 is mounted to a firearm. In one implementation inclinometer 270 is a Model LIS2DH12 ultra-low-power, high-performance, three-axis inclinometer manufactured by STMicroelectronics (Geneva, Switzerland). Any of a variety of other suitable inclinometers can be used in alternative embodiments. The output signals generated by inclinometer 270 are provided to controller 240 via circuitry mounted on printed circuit board 168.

Figure 11A:
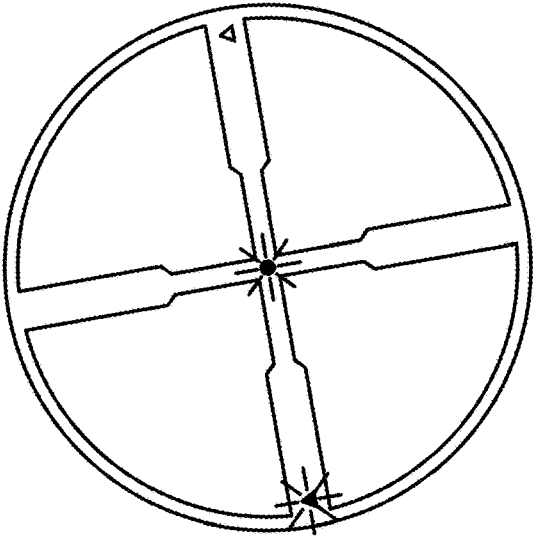
FIG. 11A illustrates the appearance of the reticle illustrated in FIG. 4 when the reticle is viewed through an optical sighting device that is canted counterclockwise (CCW).
Figure 11B:
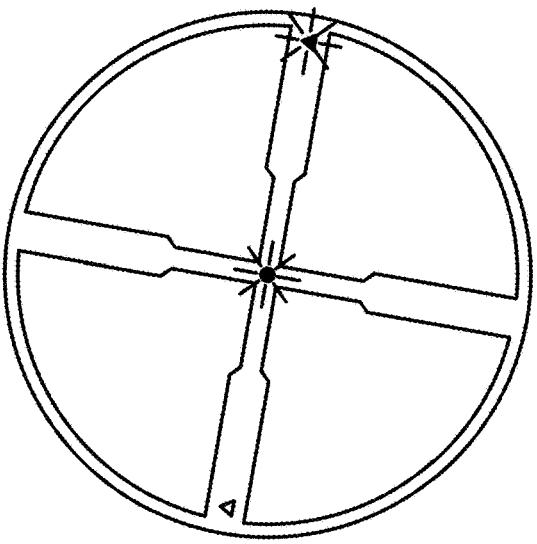
FIG. 11B illustrates the appearance of the reticle illustrated in FIG. 4 when the reticle is viewed through an optical sighting device that is canted clockwise (CW).
Figure 11C:
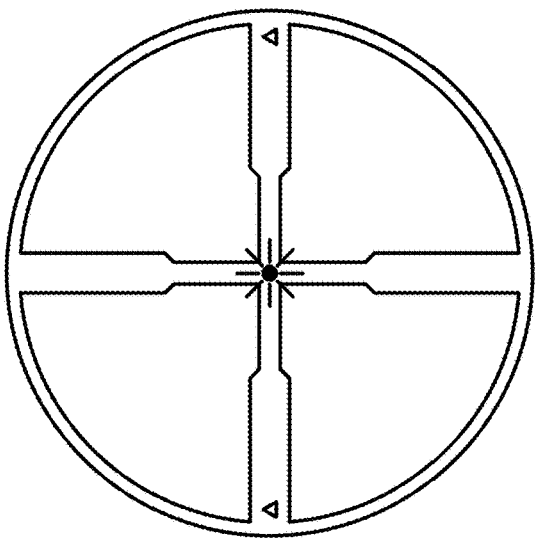
FIG. 11C illustrates the appearance of the reticle illustrated in FIG. 4 when the reticle is viewed through an optical sighting device that is not canted.

For example, if inclinometer 270 detects that riflescope 100 is canted CCW around the optical axis (the z-axis), controller 240 can be configured to illuminate CCW LED 214 steadily. Alternatively, if inclinometer 270 detects that riflescope 100 is canted CW around the optical axis (z-axis), controller 240 can be configured to illuminate CW LED 224 steadily. In either case, controller 240 can also be configured to illuminate center LED 234 intermittently, such as in a blinking fashion. These reticle configurations, which are illustrated in FIG. 11A (CCW cant) and FIG. 11B (CW cant), provides the shooter with a quick indication that riflescope 100 is not level, even without requiring the shooter to divert his/her attention from the center target point of the reticle. In particular, even without perceiving either of the illuminated cant indicator positions at the periphery of reticle, blinking level indicator position 230 at the center target point conveys to the shooter that the riflescope is canted. The steady illumination of one of the cant indicator positions conveys to the shooter how to adjust his/her hold on the firearm (for example, by rotation) to obtain a level shot. Likewise, if the shooter sees that level indicator position 230 is steadily illuminated, he/she will understand that the riflescope is not canted, again without diverting attention from the central target point. This reticle configuration is illustrated in FIG. 11C. This design avoids distracting the shooter with many lights or other potential distractions when he/she is ready to discharge the firearm.

In alternative embodiments reticle 200 can be configured to indicate the presence of cant using other combinations of illuminated cant indicators. For example, in an embodiment wherein the optional central level indicator position 230 is omitted, CCW LED 214 or CW LED 224 can be configured to illuminate, optionally intermittently (in a blinking fashion), depending on how the riflescope 100 is canted, if at all. In such embodiments the rate at which an illuminated cant indicator blinks is optionally proportional to the degree of cant, for example such that more extreme cant angles result in more rapid blinking of the indicator. As the reticle is rotated to achieve a level position the blinking slows, with the cant indicators eventually turning off completely when riflescope 100 is not canted. The absence of any illuminated cant indicators within the riflescope 100 indicates that the riflescope is held level. The use of variably-blinking cant indicators can also be used in another alternative embodiment wherein the central target point is always illuminated, which may be useful when implemented in conjunction with an illuminated reticle. In general, the use of variable-blinking cant indicators with a steadily illuminated (or altogether omitted) target point may be particularly useful in conjunction with riflescopes which are occasionally used at short ranges where a slight cant is less critical and the blinking target point could be distracting. Other combinations of illuminated cant indicators, and optionally a central target point indicator, can be used in other embodiments.

Although the above discussion described in detail how the cant indicators may be integrated into or associated with the reticle 200 of the riflescope 100, embodiments of the invention are not limited to always being mounted on or adjacent to the reticle 200. A riflescope 100 may be generally described as a direct-view, see-through, or optical scope. Such scopes are made from a transparent material, most commonly glass or plastic, and allow a direct viewing of a target when a user looks through the ocular end 120 of the riflescope 100. Each riflescope 100 includes a front focal plane and a rear focal plane, which are both in focus to the user's eyes when the riflescope is properly focused. Operation of the magnification control 170 causes indications on the front focal plane, if any, to appear larger or smaller through the riflescope 100 depending on which way the magnification control is operated. Embodiments of the invention may include indicators that are physically located on either of the front of the front or rear focal plane. Carrying a light signal to the front focal plane may include using a longer flexible circuit 250 than illustrated in FIG. 6B, or by using longer light guides, such as the CCW light guide 216 illustrated in FIG. 7. In this manner the indicator signal may be physically located anywhere within the field of view through the riflescope 100 as the user is looking through the riflescope.

In yet other embodiments the cant indicator need not be a visual indicator, but may instead (or in addition to) include a haptic or an aural indicator. With reference to FIGS. 9 and 10, in such systems only minor modifications to the LED driving circuit need be made. For the haptic indicator embodiment, the Center, CCW and CW LEDs 214, 234, 224 may be replaced by or operated in conjunction with a haptic generator, such as a vibratory motor. A switch may be placed in a position that allows the user to operate it while the user is simultaneously looking through the riflescope 100. For example, the switch may be located near the trigger of the firearm, or further down the barrel in a position where the switch may be operated by the hand used to support the firearm. When the switch is depressed, the inclinometer 270 and controller 240 operate as described above, detecting the rotation about the z-axis of the firearm. A haptic signal is then generated in response to the switch press. Particular haptic patterns may indicate various amounts or directions of rotation. For example, a short vibration may indicate CW rotation, two short vibrations may indicate CCW rotation, and a long vibration may indicate that the riflescope 100 is vertically aligned. A similar system may be used with the cant indicator generating an aural feedback. In an example aural system, a short chirp of a piezo-electric speaker may indicate CW rotation, a two chirp signal indicates CCW rotation, and a long chirp indicates that the riflescope 100 is vertically aligned. In some embodiments any or all of these feedback systems may be employed, either in conjunction or independently operated. A selector switch or programmable setting (not illustrated) allows the user to select which and how many indicator systems, visual, haptic, or aural, will be used.

While various embodiments of the cant indicator described above are directed to telescopic sights and scopes, as described above, it can be difficult or impossible to install a new or replacement reticle in an existing optical system. Therefore, other embodiments of the invention are not housed in a sight or scope, but instead include an accessory that can be added or attached to an existing optical system to provide cant indication in the accessory itself. For example, in one such alternative embodiment, an accessory is mounted on either the ocular or objective end of a scope and provides illuminated cant indicators independent of an existing reticle, if any, in the scope. In other words, the accessory provides cant indication for scopes that do not have their own cant indicator. Although duplicative, the cant indication accessory could also be used in conjunction with a scope that already included cant indication, such as those scopes described above. In such a case, both the scope having cant indication and the accessory having cant indication would indicate to the user whether the scope was canted.

The cant indicating accessory may be mounted to the existing optical device using, for example, a threaded, snap-fit, or adhesive configuration. Even though the cant indicators in the accessory are not actually mounted on the reticle or reticle holder, they are still visible in the peripheral vision of a user sighting through the scope. This is because the user's eye will generally be positioned a few inches away from the surface of the ocular lens. Such an accessory provides a relatively easy and inexpensive way of adding cant detection functionality to an existing scope that doesn't have its own cant detection. This is particularly true when compared to the complexity and cost associated with replacing or adding a cant-indicating reticle to an existing scope.

Figure 12:
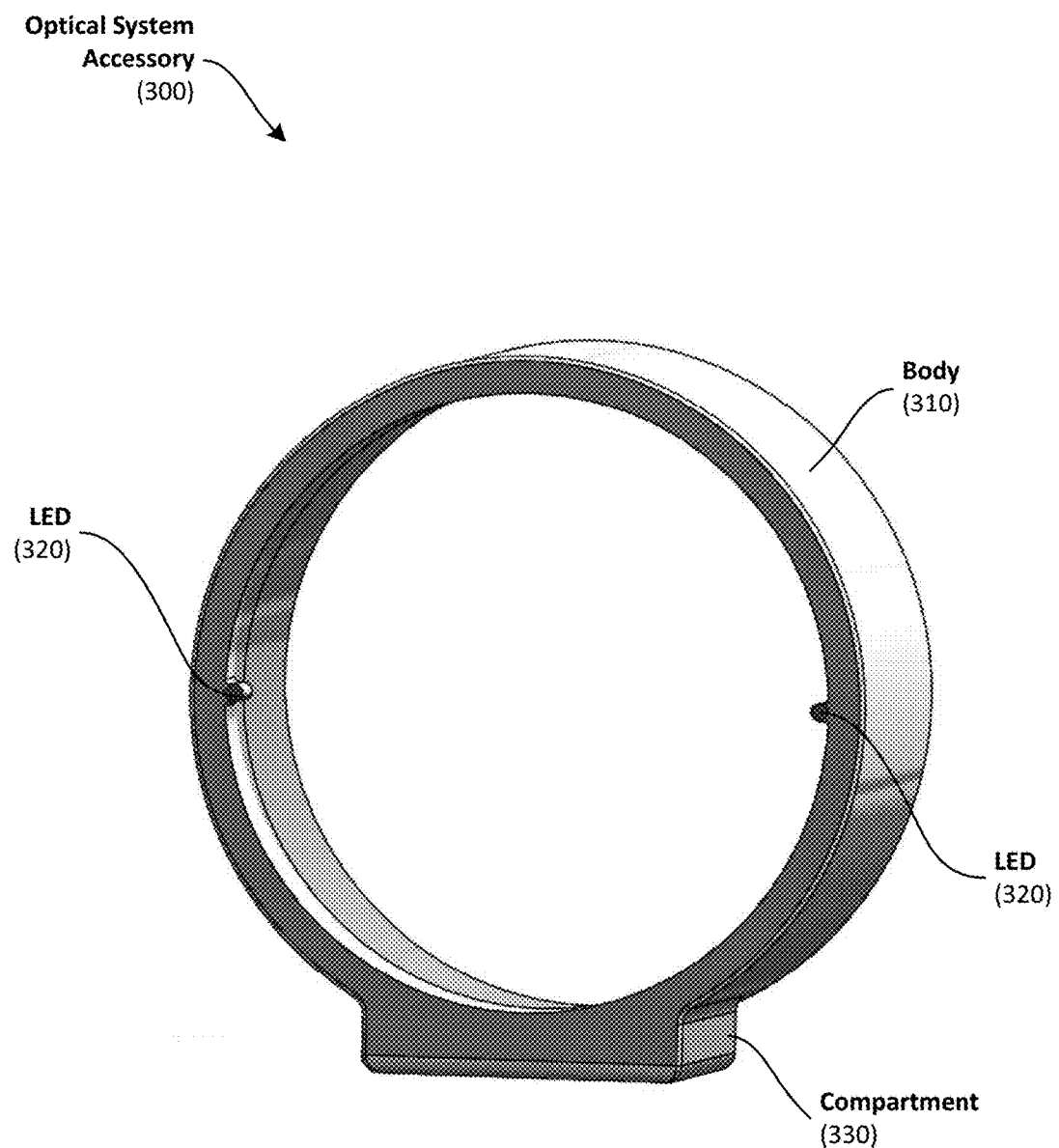
FIG. 12 is a perspective view of the rearward appearance of an example optical system accessory that is capable of indicating whether an optical system is canted off-center.

FIG. 12 is a perspective view of a rearward appearance of an example embodiment of an optical system accessory 300 having cant detection functionality. Accessory 300 includes a ring-shaped body 310 having one or more LEDs 320 positioned on an inner circumferential surface of the ring-shaped body 310. The ring shape allows accessory 300 to be mounted to either the ocular or objective end of an optical system such as a riflescope. Example mounting techniques include a thread-fit, a snap-fit, a bayonet-fit, a clamp-fit, or an adhesive seal. For instance, an accessory that is capable of being threaded onto on optical system would be particularly useful since many such systems include threaded ocular and/or objective lenses that facilitate the attachment of accessories such as lens covers. In some implementations body 310 has a depth that causes the user's eye to be set back from LEDs 320, thus ensuring that LEDs 320 are visible in the user's peripheral vision. In another embodiment, not illustrated in FIG. 12, one or more LEDs are positioned on an external circumferential surface of the ring-shaped body 310. In other embodiments the body 310 need not be ring shaped, and may instead be, for example, U-shaped, generally existing as illustrated in FIG. 12, except the top portion of the body 310 is excluded, and only the portion of the ring below the LEDs 320 is formed as part of the body 310.

Figure 14A:
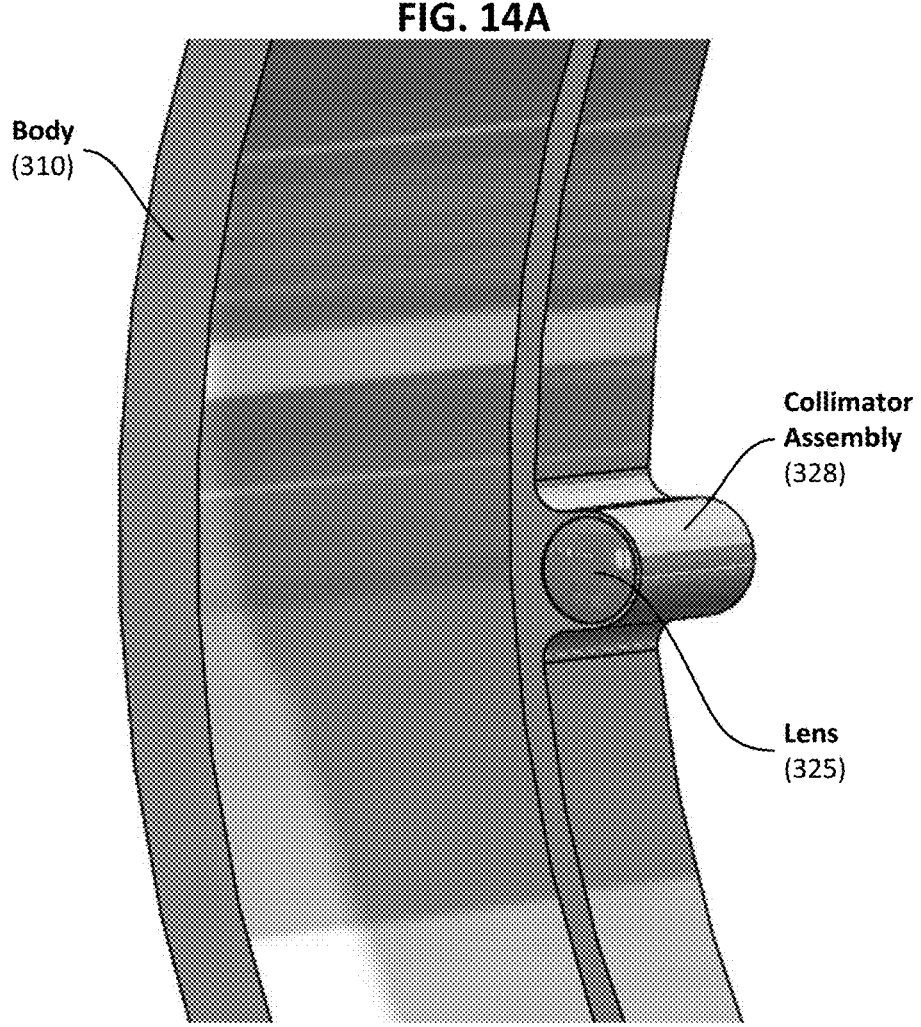
FIG. 14A is a detailed perspective view of the forward appearance of an example collimator assembly that forms part of the example optical system accessory of FIG. 11.
Figure 14B:
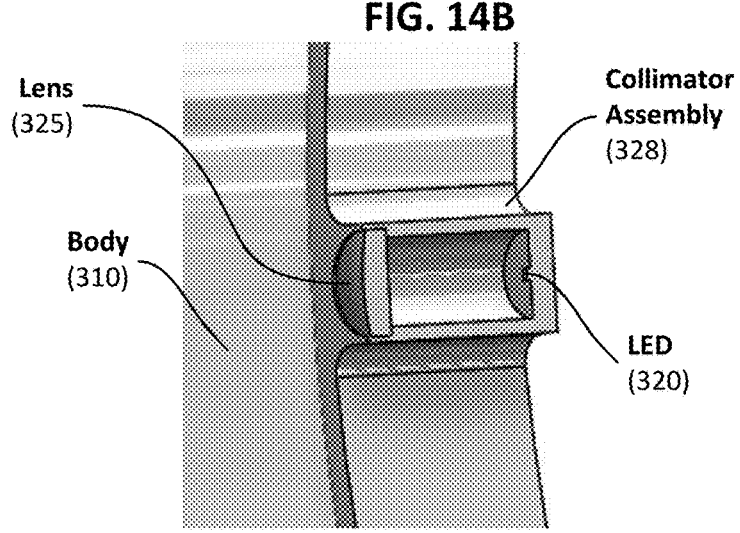
FIG. 14B is a cutaway perspective view illustrating an interior section of the example collimator assembly of FIG. 14A.

FIG. 13 schematically illustrates the frontward appearance of optical system accessory 300. A collimating lens 325 is optionally positioned over LEDs 320, such that light generated by LEDs 320 passes through collimating lens 325 before reaching the user's eye. As illustrated in FIGS. 14A and 14B, in one implementation, collimating lens 325 is mounted in a collimator assembly 328 such that lens 325 is spaced apart from LED 320. FIG. 14A is a detailed perspective view of the frontward appearance of collimator assembly 328, and FIG. 14B is a cutaway view schematically illustrating an interior section of collimator assembly 328, both of which illustrate the collimator assembly 328. The collimator assembly 328 is not necessary in all embodiments.

As illustrated in FIGS. 12 and 13, accessory 300 further includes a compartment 330 configured to house components supporting or otherwise controlling the operation of accessory 300. One example of such a component includes a battery that functions as a power source for LEDs 320. In one embodiment a three-volt coin cell lithium battery is used, although any of a wide variety of suitable power sources can be used in other embodiments. For instance, in an alternative embodiment a solar cell is positioned on an exterior surface of the body 310, wherein the solar cell is configured to replace or supplement a battery power source. In other embodiments, the accessory 300 can be electrically coupled to a separate power source, such as a battery contained in a scope or firearm. Another example of a component that is housed in compartment 300 is a printed circuit board having mounted thereon electronics that enable and control operation of LEDs 320. Such electronics include a controller and an inclinometer. The above-mentioned battery is optionally detachably coupled to the printed circuit board as well. In one implementation, substantially the same control circuitry that is used to control CCW LED 214 and CW LED 224, which are included in reticle 200, are also used to control LEDs 320 in accessory 300. In some embodiments of the accessory 300, control circuitry associated with center LED 234 may be omitted. The circuitry may be the same or similar to the circuit described with reference to FIG. 10 above.

Similar to the LEDs included in reticle 200, LEDs 320 can be selectively illuminated to indicate that accessory 300—and, by extension, the optical system to which it accessory 300 mounted—is canted. In particular, if the inclinometer mounted in compartment 330 detects that accessory 300 is canted in a first direction, the controller can be configured to illuminate a first one of LEDs 320. Alternatively, if the inclinometer detects that accessory 300 is canted in a second direction that is opposite the first direction, the controller can be configured to illuminate a second one of LEDs 320. As disclosed with respect to reticle 200, various illumination schemes can be implemented, including schemes that include intermittently (in a blinking fashion) illuminating one of the LEDs with a frequency that is proportional to the detected degree of cant. In one embodiment, both LEDs are illuminated or extinguished when no cant is detected. In another embodiment, an LED that has a different color, or that is otherwise distinguishable, is illuminated when no cant is detected. In yet another embodiment, only a single LED 320 is used to indicate cant. In this embodiment, the single LED 320 blinks if the rifle or scope is canted in either direction, and glows steady or extinguishes when no cant is detected. In some embodiments the LED 320 blinks at a faster rate the further canted the rifle is. Such a single-LED 320 system is relatively easy to implement, although it may not convey as much information as a two or three (including center) LED system.

In one implementation, accessory 300 is mounted to a scope which is, in turn, mounted to a firearm, such as a rifle. One way of assembling and calibrating this combination is as follows. The firearm is first mounted in a stable fixture, such as a vice, and leveled. The scope that does not have cant indication is then mounted and leveled with respect to the firearm using, for example, a system of standard mounting rings. Accessory 300, having cant indication, can then be mounted to the scope, adjacent to either the ocular or objective lenses. The accessory can be rotated until level, as indicated by the one or more LEDs 320. In some embodiments, when the accessory is determined to be properly aligned on the scope, the rotational position of the accessory with respect to the scope can be fixed by using, for example, a clamp or set screw. In implementations in which accessory 300 is mounted to the objective lens, LEDs 320 will be visible by sighting through the scope. In implementations wherein accessory 300 is mounted to the ocular lens, LEDs 320 are directly visible without sighting through the scope.

Figure 15:
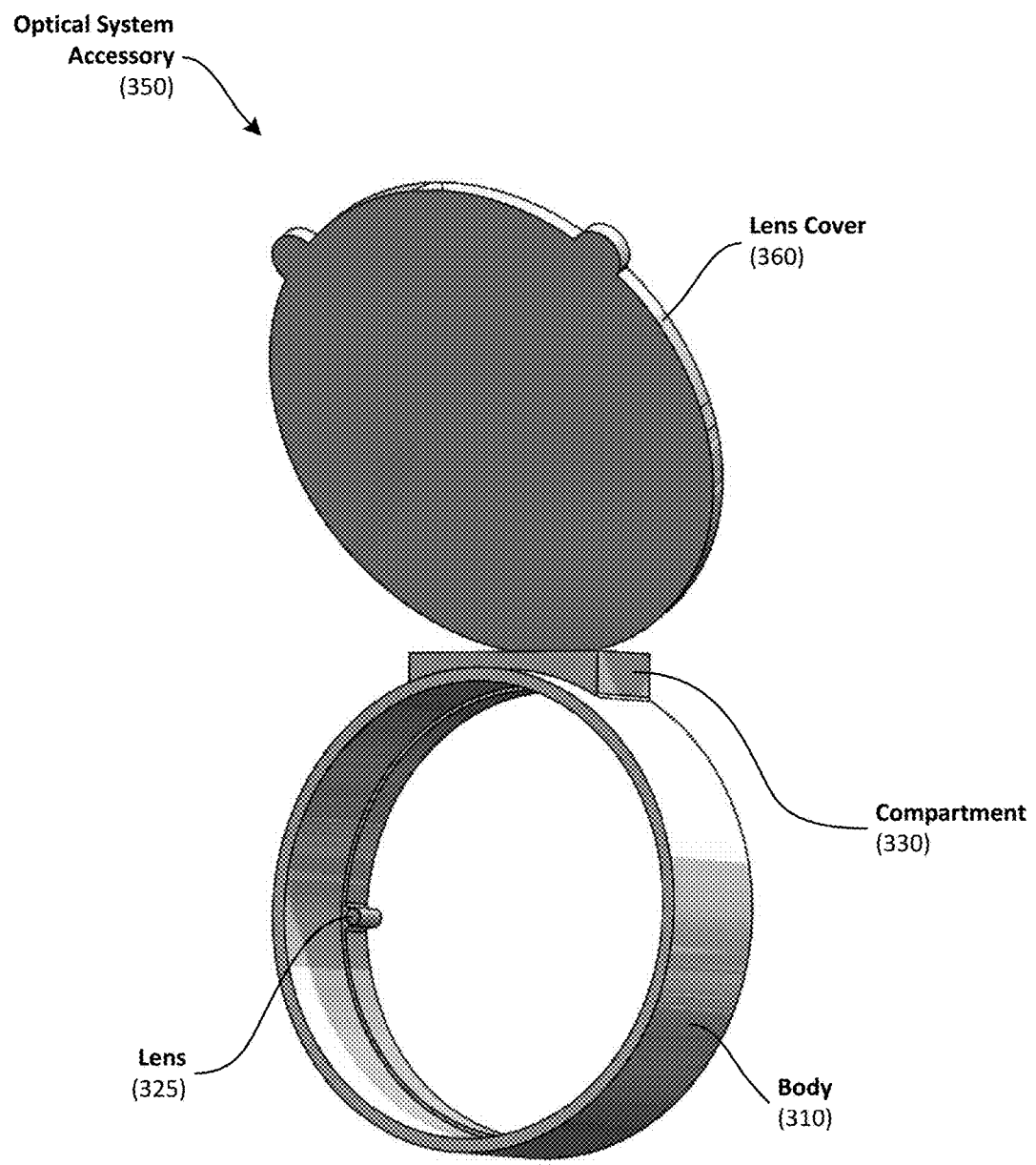
FIG. 15 is a perspective view of the frontward appearance of an example optical system accessory that is capable of indicating whether an optical system is canted off-center and that includes a flip-back protective lens cover

In some cases, the accessory 300 optionally includes a flip-back protective lens cover. For example, FIG. 15 is a perspective view of the frontward appearance of an example embodiment of a modified optical system accessory 350 that includes a flip-back lens cover 360. The lens cover 360 provides a protective cover for the optical system when not in use. In one embodiment, the lens cover 360 is attached to the compartment 330 with a rotatable hinge, although other movable or pivoting attachment mechanisms can be used in other embodiments. The lens cover 360 optionally includes a magnet aligned with a corresponding magnet positioned on body 310 to hold cover 360 in place when the optical system is not in use. In one implementation, closing the lens cover 360 causes a switch in the above-mentioned control electronics to be opened, thereby turning the electronics off and conserving battery power when the scope is not in use. Similarly, opening the lens cover can close a switch to turn the electronics on.

As described above for the optics having integrated cant indication, embodiments of the accessory need not necessarily be a visual indicator, but may instead (or in addition to) include a haptic or an aural indicator.

The foregoing detailed description has been presented for the purposes of illustration and description. It is not intended to be exhaustive or to limit the invention to the particular disclosed embodiments. Numerous variations and configurations will be apparent in light of this disclosure. Thus its intended that the scope of the invention be defined not be this detailed description, but rather by the claims appended hereto.

What is claimed is:

1. A cant-detecting device that is configured to be fixedly mounted to an optical system for a shooting device, the device comprising:
    an electronic inclinometer configured to determine a cant of the mounted optical system; and
    a collimator assembly, including:
        an electronic indicator structured to provide an indicator signal to a user related to the determined cant, and
        a collimating lens mounted to the collimator assembly spaced apart from the electronic indicator.

2. The device of claim 1, further comprising a hollow, ring-shaped body that is configured to be coupled to the optical system.

3. The device of claim 2, in which the ring-shaped body is configured to be threadedly attached to the optical system at an ocular end of the optical system.

4. The device of claim 1, further comprising a hollow body configured to receive the optical system, wherein the inclinometer and the light emitter are coupled to the body.

5. The device of claim 1, in which the electronic indicator is one or more light emitting devices, the cant-detecting device further comprising:
    a body, wherein the collimator assembly is coupled to or integrated in the body.

6. The device of claim 1, in which the electronic inclinometer comprises at least one accelerometer.

7. A cant-detecting accessory for an optical system comprising:
    a hollow, at least partially ring-shaped body having interior and exterior circumferential surfaces, wherein the body is capable of engaging at least a portion of the optical system;
    a collimator assembly coupled to the body, the collimator assembly including a first light emitter;
    a compartment coupled to the body; and
    an inclinometer disposed within the compartment, wherein the inclinometer is configured to generate a signal in response to detecting that the optical system is canted, and wherein the first light emitter illuminates in response to the signal.

8. The cant-detecting accessory of claim 7, wherein the body includes receiving threads structured to engage with matching threads of an ocular lens or an objective lens of a riflescope.

9. The cant-detecting accessory of claim 7, wherein the first light emitter is coupled to the interior circumferential surface of the body.

10. The cant-detecting accessory of claim 7, wherein the inclinometer includes at least one accelerometer.

11. The cant-detecting accessory of claim 7, further comprising a second light emitter that is coupled to the body, the second light emitter positioned diametrically opposite the body from the first light emitter.

12. The cant-detecting accessory of claim 7, further comprising a second light emitter in the collimator assembly, wherein the inclinometer is configured to generate a second signal in response to detecting that the optical system is not canted, and wherein the second light emitter is configured to illuminate in response to the second signal.

13. The cant-detecting accessory of claim 7, further comprising a second light emitter in the collimator assembly, wherein the inclinometer is configured to generate a second signal in response to detecting that the optical system is not canted, and wherein the first and second light emitters are configured to illuminate in response to the second signal.

14. A cant-detection device comprising:
    a hollow ring-shaped body having interior and exterior circumferential surfaces, and having an optical axis passing therethrough;
    a first collimator assembly positioned adjacent to one of the interior or exterior surfaces;
    a light emitter disposed in the first collimator assembly;
    a compartment coupled to the ring-shaped body, the compartment including an interior void; and
    an inclinometer disposed within the compartment, wherein the inclinometer is configured to generate a signal in response to detecting rotation of the body around the optical axis, and wherein the light emitter is configured to illuminate in response to the signal.

15. The cant-detection device of claim 14, wherein the first collimator assembly is positioned adjacent to the interior surface of the hollow ring-shaped body.

16. The cant-detection device of claim 14, further comprising a protective lens cover that is mounted to the compartment, wherein the protective lens cover is structured to remain in either an open position or a closed position unless acted upon.

17. The cant-detection device of claim 14, in which the protective lens cover is rotatable with respect to the body.

18. The cant-detection device of claim 14:
    further comprising a battery positioned in the interior void of the compartment;
    wherein the inclinometer and the battery are electronically coupled to a circuit that is also positioned within the compartment; and
    wherein the circuit includes a switch that, when closed, enables the battery to supply power to the light emitter, and that, when opened, prevents the battery from supplying power to the light emitter.

19. The cant-detection device of claim 14:
    further comprising a protective lens cover that is mounted to, and rotatable with respect to, the compartment, wherein the protective lens cover is capable of being positioned in either an open position or a closed position
    further comprising a battery positioned within the interior void of the compartment;
    wherein the inclinometer and the battery are electronically coupled to a circuit that is also positioned within the compartment;
    wherein the circuit includes a switch that, when closed, enables the battery to supply power to the light emitter, and that, when opened, prevents the battery from supplying power to the light emitter; and
    wherein closing the protective lens cover causes the switch to open.

20. The cant-detection device of claim 14, further comprising a protective lens cover that is hingedly mounted to the compartment containing an electrical circuit.

\* \* \* \* \*